United States Patent [19]

Stigler

[11] Patent Number: 4,604,252

[45] Date of Patent: Aug. 5, 1986

[54] PROCESS FOR THE PRODUCTION OF A PROFILE FROM DRY POWDER MATERIAL ALONG WITH A CONTRIVANCE FOR THIS PURPOSE

[76] Inventor: Anton Stigler, Am Rad 5½, 8240 Berchtesgaden, Fed. Rep. of Germany

[21] Appl. No.: 610,195

[22] Filed: May 14, 1984

[30] Foreign Application Priority Data

Jun. 13, 1983 [DE] Fed. Rep. of Germany ....... 3321285

[51] Int. Cl.$^4$ .............................................. B28B 3/00
[52] U.S. Cl. .................................. 264/120; 264/313; 264/314; 419/3; 419/42; 419/68
[58] Field of Search ...................... 264/314, 120, 313; 419/3, 68, 42

[56] References Cited

U.S. PATENT DOCUMENTS

| | | | |
|---|---|---|---|
| 2,936,483 | 5/1960 | Deakin | 264/314 |
| 3,092,878 | 6/1963 | Conger | 264/120 |
| 3,193,900 | 6/1965 | Wendt | 25/31 |
| 3,193,901 | 7/1965 | Lee et al. | 264/314 |
| 3,200,442 | 8/1965 | Haller | 264/314 |
| 4,370,120 | 1/1983 | Foster et al. | 425/405 |

FOREIGN PATENT DOCUMENTS

| | | |
|---|---|---|
| 752704 | 2/1973 | Fed. Rep. of Germany . |
| 2147333 | 7/1977 | Fed. Rep. of Germany . |
| 2074086 | 10/1981 | United Kingdom . |

*Primary Examiner*—James Derrington
*Attorney, Agent, or Firm*—Orrin M. Haugen; Thomas J. Nikolai

[57] ABSTRACT

A process for the production of a hollow or a solid profile (21) from dry powder material (27) is accomplished by means of a flexible form (7), through means of which a mold cavity (25) is enclosed in sleeve fashion. The flexible form (7) is capable of being placed under external pressure, over its entire length, radially from all sides, in order to compact, radially, the powder material (27) found, and capable of being poured, inside the form (7). In order to be able to produce endless solid profiles and/or hollow profiles from dry powder material, provided for is that the production of the profile (21) can be accomplished by sections and, additionally, that the mold form (25), running constant at its one end up to the profile diameter, and here limited by the precompacted profile section (21) and at its other end by the mutually convergent inner surfaces (8) of the flexible form provided with a top supply opening (17), is uniformly filled with a measured amount of powder material (27). The extrusion process is accomplished here such that, because of the convergence of the elastic form (7) mentioned, the tapered, formed-out profile end (23) of a precompacted profile section (21) is covered over by the radially compacted powder material (27) and, in this manner, is joined therewith. In the next step, the thusly pressed profile section (21) is pushed toward the outside by one step.

4 Claims, 6 Drawing Figures

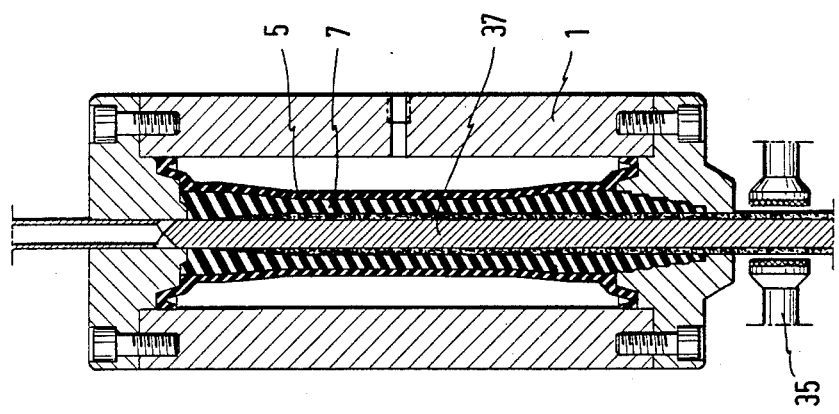
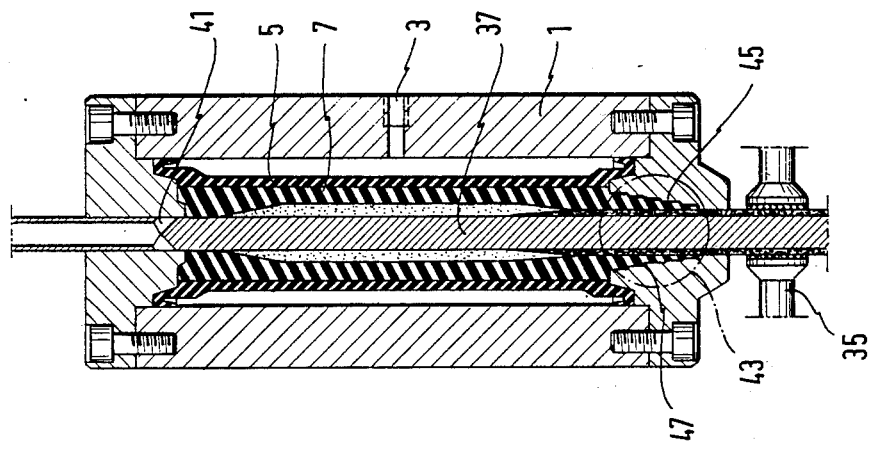
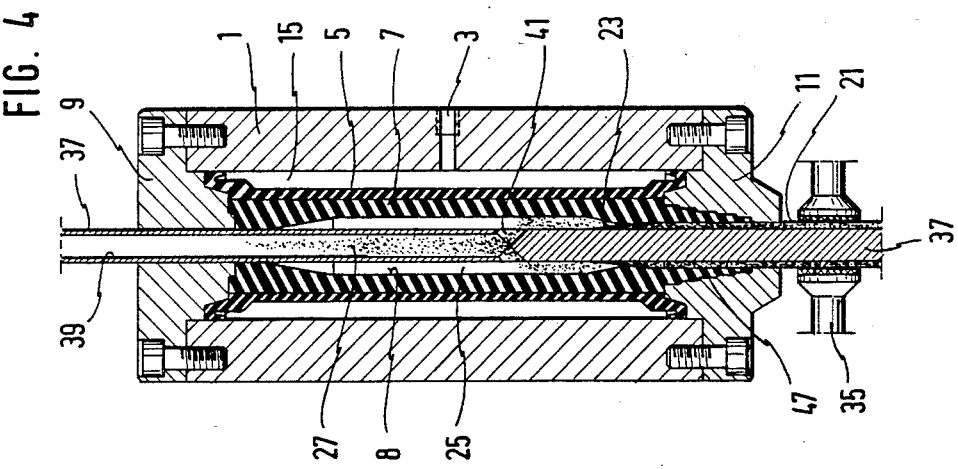

PROCESS FOR THE PRODUCTION OF A PROFILE FROM DRY POWDER MATERIAL ALONG WITH A CONTRIVANCE FOR THIS PURPOSE

BACKGROUND OF THE INVENTION

The invention concerns a process for the production of a profile structure from dry powder material based on the precharacterizing clause of claim 1, along with an apparatus for carrying out the process.

Isostatic or quasi-isostatic presses for producing solid or hollow structures or profiles, for example tubes, have become known from British Pat. No. 2,074,086; U.S. Pat. No. 4,370,120; and U.S. Pat. No. 3,193,900 and consist essentially of a mold cavity that is surrounded and limited by a flexible form. The flexible form is capable of being acted upon, in its axial length and radially from all sides, with a pressure, for example hydraulic or pneumatic, whereby the powder material capable of being brought into the mold cavity, for example via a pressure space, can be compacted and pressed in the radial direction. However, it is possible, through means of these previously known presses and the therewith associated production processes, to produce only profiled pieces, hence, for example, tubes which are limited in their length.

However, having become known from German Pat. No. 752,704 and German Auslegeschrift No. 21 47 333 is also a process and an apparatus for the step-by-step production of a continuous extrusion of pressed pieces. In the case of the previously known extrusion process from German Pat. No. 752,704, however, compacting is done step-by-step, from top to bottom, only in the axial direction by means of a press ram. This can, on the one hand, work out disadvantageously for a uniform compaction and on the other hand, for sufficient binding of those extruded sections compacted step-by-step one after the other.

SUMMARY OF THE INVENTION

By comparison, the task for the invention is to procure a process and an apparatus for carrying out the process for the production of endless, solid and/or hollow profiles from dry powder material by means of isostatic presses, with which the profile structures can be produced with uniform density (thickness) distribution and with high resistance to breakage. The task, relative to the process, is accomplished by the use of a flexible form fashioned as a sleeve surrounds a mold cavity capable of being placed under external pressure radially over its entire length and thereby radially compact the powder material disposed in the mold cavity. The process is characterized by the fact that the production of a profile of unlimited length is accomplished by the formation of sections or segments with the mold form of constant diameter at one end and of a diameter up to the profile diameter and which is normally restricted by the presence of a previously compacted profile section or segment and limited at its other end by the mutually convergent inner surfaces of the flexible form. The flexible form which is provided with a top supply opening, is uniformly filled with a measured amount of powder material, with the top supply opening being closed and the powder then compacted while the previously compacted profile section is being held firmly clamped. The procedure is such that because of the convergence of the elastic form or sleeve, the tapered, formed end of the profile is covered over by the radially compacted powder material and joined therewith. The section or segment is then unloaded from the flexible form and the newly compacted profile section is advanced so that the region of the mold cavity extending up to the external diameter of the profile surrounds the tapered, formed profile end of the last profile section.

The apparatus is characterized in that the mold cavity is constructed so that it is tapered toward its two frontal ends from its center section, with the inner walls of the filling cavity converging toward one frontal end down to the closable supply opening and converging on its other frontal end down to a profile outlet opening corresponding to the diameter of the profile. Advantageous configurations are given hereinafter.

Through means of the process in accordance with the invention, a continuous, sectional production of solid as well as hollow profiles from dry powder material becomes possible for the first time, in simple and optimal fashion.

In so doing, the profiled parts to be produced can, in particular, display a circular or oval cross-section. However, other shapes are just as possible also. The quality of hollowness of the completely compacted formed parts is enabled, in particular, by the specific construction of the conically running end sections of the mold cavity and, therewith, also of the formed profile parts.

In a particularly preferred construction of the invention there is further provided a core rod in order to enable one to produce, endlessly, hollow profiles also, in particular tubes.

In a particularly preferred form of embodiment of the invention for the production of hollow profiles, there is provided, on the inside of the mold, a core rod that is displaceably guided in the axial direction and through which the dry powder material is fed, being passed through an internal boring in the core rod and over radial outlet openings into the mold cavity.

An apparatus is disclosed where, in an advantageous embodiment, there is provided a so-called compensation zone at the outlet of the extruded profile section for minimizing and reducing the forces diverted in the axial direction during the extrusion operation. This arrangement avoids damage to the extruded profile part in question.

Accordingly, therefore, the following advantages are capable of being obtained by the process in accordance with the invention and the apparatus in accordance with the invention:

1. With comparatively low mold costs, a wide variety of profiles are capable of being produced. Required here, in each case, is merely replacement of the internal, flexible extruder form, that is to say of the flexible mold cavity.

2. The endless long hollow or solid profiles which may be produced in accordance with the invention can be produced from dry pressed powder, with absolutely uniform density distribution.

3. Output capacity can amount to a multiple of all previously known processes.

4. A drying process is not necessary.

A high degree of dimensional stability of the profiles can be achieved by means of a finishing machine located immediately at the extrusion output, e.g., a grinding machine or equivalent.

IN THE DRAWINGS

Further advantages, particulars and features of the invention are obtained in the following from the examples of embodiment illustrated with the aid of drawings. Shown here in particular:

FIGS. 1 to 3: An apparatus in accordance with the invention in a first example of embodiment, in a longitudinal cut, in three different processing steps;

FIGS. 4 to 6: Another form of embodiment of the apparatus in accordance with the invention in a schematic, longitudinal cut illustration, in three different processing steps, with which hollow profiles can be produced.

DESCRIPTION OF THE PREFERRED EMBODIMENT

Figure 1:
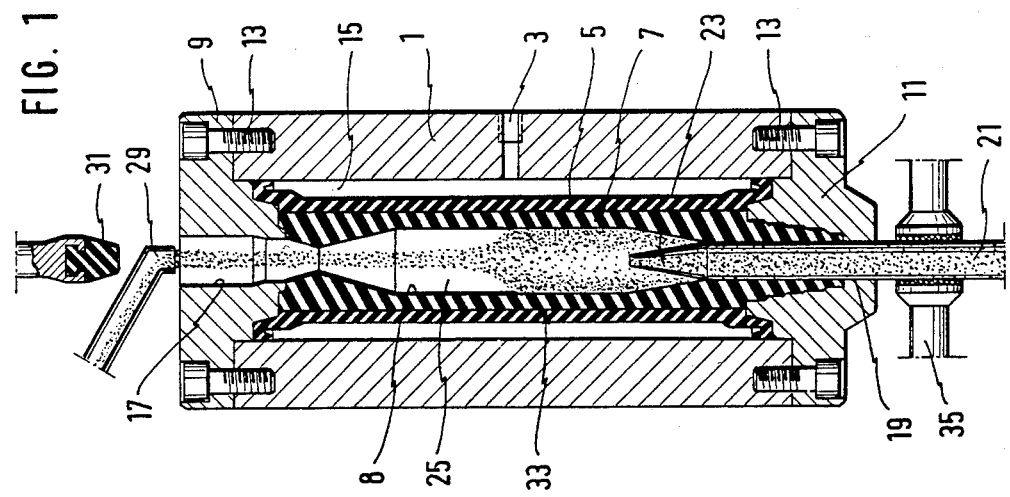
Figure 2:
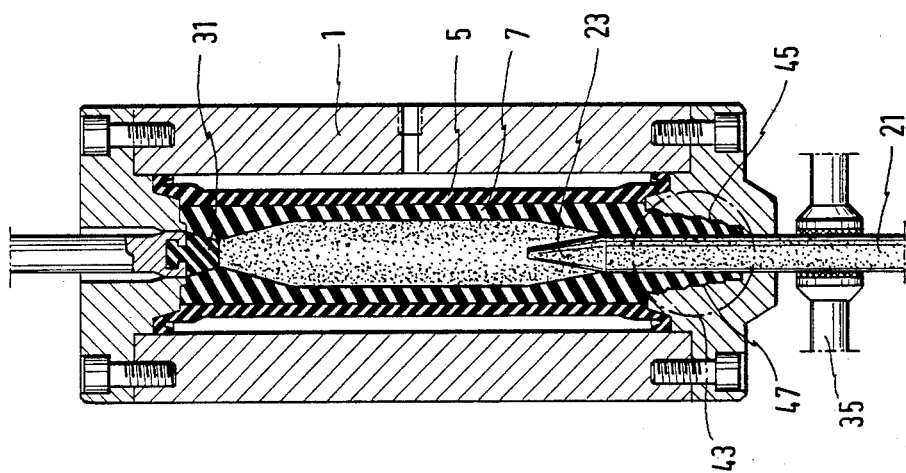
Figure 3:
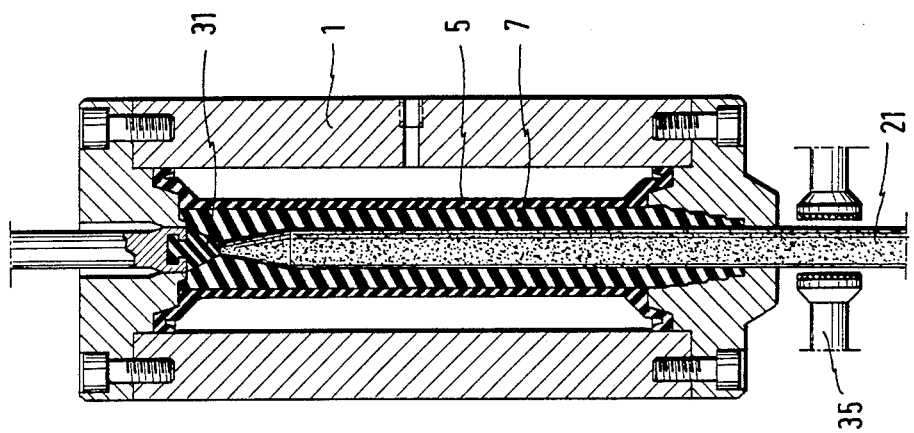

Reference will first be made to FIGS. 1 to 3 in which a first example of embodiment of the radial dry powder extruder press for production of solid profiles, in which there is shown, for example, an embodiment having a circular cross-section.

The extruder here consists of a pressure tank 1 that is provided with a connector 3 for feeding in the pressure medium. Built in the pressure tank 1 is an external, flexible sealing membrane 5 in which is disposed, on the inside, the flexible and mold cavity forming form 7, with an inner surface 8. The pressure tank is closed on the forward side by a top pressure flange 9 and a lower pressure flange 11. Here, bolting can be done by means of hollow screws 13.

The connector 3 for the pressure medium is in communication, inside the pressure tank 1, with a circular space 15, the axial height of which corresponds essentially to the height of the sealing membrane 5, respectively the elastic form 7.

As is observed from FIG. 1, provided in the top pressure flange 9 is a supply boring 17. Located in the lower pressure flange 11 is a profile outlet opening 19.

The following is an explanation of the method of operation of the extruder press.

In FIG. 1, the last pressed profile section 21 has already been pulled outwardly to the extent that only its conical profile end 23 still projects into the mold cavity 25 which is limited by the elastic form 7. With the top supply bore 17 open, the dry pressing powder, e.g. ceramic pressing powder or powdered metals, or similar, is then poured, via a chute 29, into the mold cavity 25 up to the top end. Afterward, the top supply opening 17 is closed by means of a stopper 31, as is shown in FIG. 2.

In doing this, it is important that the mold cavity 25 taper, from its two opposed axial ends, toward its center section 33, and actually, at the top end up to the supply boring 17 and at the lower end up to the profile outlet opening 19 corresponding to the profile diameter. During filling of the fill space either volumetrically or by weight with a premetered amount of pressing powder, there then results a covering over of the poured-in, uncompacted pressing powder with the profile end 23 of the already pressed last profile 21.

As shown in FIG. 3, pressure medium is now supplied inside the pressure tank, via the connector 3 and the circular space 15, with the sealing membrane 5 and the elastic form 7 being radially pressed together. In this manner, the poured-in pressing powder is likewise compressed and compacted up to the external diameter of the profile, whereby is also achieved, in the area covered over, at the profile end 23, a firm corresponding with the last extruded profile 21.

As is further obtained from FIGS. 1 to 3, disposed outside the pressure tank is also gripper pair 35 that firmly holds the outwardly projecting profile 21 during the entire filling and extruding process. After a new filling is also compressed, the profile 21, with open gripper pair 35, can, by means of another gripper, not shown, be pulled out downwardly by one section, or even in the axial direction by means of the gripper pair 35.

The following discussion is directed to FIGS. 4 to 6, in which same or similar parts are designated with the same reference numbers. This embodiment is differentiated from the previously explained one by the fact that hollow profiles, in particular endless tubes, can be produced cyclicly herewith.

In this form of embodiment, the mold cavity 25 is completely traversed, in the axial direction, by a core rod 37 on whose lower, projecting end is disposed the last extruded hollow profile 21 having the profile end 23 that extends into the mold cavity 25. Produced in the core rod 37 is a longitudinal boring 39 over which the dry pressing powder 27 flows into the fill space 25 via radial outlet openings 41, for example likewise again in a volumetrically or by weight, pre-metered amount. During filling, the core rod 37 is slowly pulled back from bottom toward the top. The fill process is terminated when the radial outlet openings 41 have reached the position shown in FIG. 6 in which the fill space is hermetically sealed. During filling, the gripper means 35 firmly hold the already, precedingly extruded last profile section 21, so that it does not follow the axial movement of the core rod 37.

There next follows the radial pressing operation, likewise again under pressure action, as illustrated in FIG. 6. Here also, the likewise poured-in pressing powder is optimally joined, in uniform density (thickness) with the already previously extruded hollow profile 21.

After the circular space 15 is again brought to the no-pressure state, the core rod 37, with open gripper mechanism 35, is again moved downwardly, and, actually, by one cycle length, whereby the last extruded hollow profile section 21 in turn assumes the position shown in FIG. 4, in which the radial press has again assumed its fill position.

Finally to be discussed is a compensation arrangement 43, as it is characterized in FIGS. 2 and 5 with the reference numeral 43.

Since, during the radial compacting process of the pressing powder there also occur enormous forces in the axial direction, in particular in the direction of the last compacted profile section 21, there is achieved by means of the compensation arrangement 43, a minimization of the forces in the axial direction are minimized if not a quite complete reduction, in order to avoid stress cracks on the already extruded profile 21. Here, in the examples of embodiment shown, the lower pressure flange 11 of the elastic form 7 is provided with a bore 45 tapering toward the outside. This can consist of several steps, each of which is inclined outwardly and toward the axis of symmetry, with a prolongation 47 of the elastic form 7 coming to rest in the bore 45.

Finally, to be pointed out again quite generally is that, basically, closing off of the radial openings 41 for filling the mold cavity 25 can also be undertaken in a different manner than in the example of embodiment shown, for example by sinking an internal tube down to over the radial openings 41, etc. Likewise possible is to produce, in accordance with the invention, a hollow profile with permanent core rod, where, for example, introduced into the mold cavity 17 up to below the end, over the top supply opening 17, is a hollow tube with a larger internal diameter than the core rod. By slow retraction of this hollow tube, the mold cavity will then be filled from bottom toward the top.

I claim:

1. In a process for the production of a profile structure from dry powder material selected from the group consisting of ceramic powder and powdered metals by means of a radially flexible elastic mold form surrounding, in sleeve fashion, a mold cavity with the radially flexible form being capable of being placed under external pressure radially inwardly over its entire length, and thereby radially compact the powder material disposed in the mold cavity between the inner surfaces of the flexible form; the process being characterized in that the production of a profile structure of unlimited length is accomplished by preparation of segments and, additionally, that the dry powder material is introduced into a mold form of constant diameter at the outlet end with the diameter being up to the profile diameter and with the first end being restricted by the presence of the previously compacted profile segment and with the opposed end of the flexible form having inner surfaces mutually converging toward a top feed supply opening and wherein the process includes the steps of:

(a) filling the said mold cavity with a uniform and measured amount of the dry powder material;
    (b) closing the top supply opening with the converging surfaces providing a tapered trailing zone for said powder fill material;
    (c) compacting the dry powder material therein while the trailing end of the previously compacted profile structural section is held firmly clamped adjacent the outlet end of the said mold form, the arrangement being such that because of the convergence of the elastic form toward the feed supply opening, the tapered end of the previously compacted profile is covered over by the radially compacted dry powder material and, thereby, is joined therewith; and
    (d) the profile segment being unloaded from the flexible form and with the newly compacted profile section being advanced to the extent that that certain region of the flexible form surrounding the converging portion of the mold cavity surrounds the tapered end of the previously compacted profile section.

2. A process for the production of hollow profiles in accordance with claim 1 and including introducing a core rod into said mold cavity enclosed by the sleeve-like flexible form, the process being characterized through:

(a) forming a closure for the mold cavity at its top end by positioning a core rod through the mutually converging inner surfaces of the top feed supply opening;
    (b) filling the mold cavity with a uniform measured amount of the dry powder material wherein the dry powder material is fed into the mold cavity through a longitudinal bore formed in the core rod, the longitudinal bore having radially disposed outlet openings formed through the wall of the core rod.

3. The process according to claim 2 being characterized in that during filling of the mold cavity, the said core rod is slowly retracted longitudinally through the mold cavity while the previously compacted profile section is held firmly clamped against movement within said mold cavity.

4. The process according to claim 3 being characterized in that after the step of unloading the flexible form defining the mold cavity, the core rod together with the profile section adhering thereto is advanced to the point where that region of the mold cavity converging to the diameter of the outer diameter of the profile surrounds the tapered end of the previously formed profile structural segment.

* * * * *